United States Patent [19]

Harris et al.

[11] 4,135,046

[45] Jan. 16, 1979

[54] HIGH EFFICIENCY CATALYSTS FOR OLEFIN POLYMERIZATION

[75] Inventors: James J. Harris, Pittsburgh; Richard E. Hammond, Irwin, both of Pa.

[73] Assignee: Arco Polymers, Inc., Philadelphia, Pa.

[21] Appl. No.: 772,875

[22] Filed: Feb. 28, 1977

[51] Int. Cl.$^2$ .......................... C08F 4/66; C08F 10/02
[52] U.S. Cl. ............................... 526/137; 252/429 B; 252/431 R; 526/151; 526/352
[58] Field of Search ................... 252/429 B, 431 R; 526/137, 151

[56] References Cited

FOREIGN PATENT DOCUMENTS 2013730  10/1970  Fed. Rep. of Germany.
2517567  10/1975  Fed. Rep. of Germany.
2623332  12/1976  Fed. Rep. of Germany.

OTHER PUBLICATIONS

Mole et al., Organoaluminium Compounds, Elsevier Publ. Co. (1972), pp. 89, 189.

*Primary Examiner*—Edward J. Smith
*Attorney, Agent, or Firm*—Lewis J. Young

[57] ABSTRACT

A unique high efficiency catalyst has been developed for the polymerization of ethylene. The activity of the catalyst, which uses a mixed magnesium-aluminum alkyl as a reducing agent for tetrabutyltitanate, and hydrogen chloride to deactivate excess reducing agent, is dependent on a specific and unpredicted order of addition of catalyst components.

3 Claims, No Drawings

HIGH EFFICIENCY CATALYSTS FOR OLEFIN POLYMERIZATION

BACKGROUND OF THE INVENTION

The present invention relates to the polymerization of ethylene in the presence of catalysts known in the art as Ziegler catalysts.

Ziegler catalysts are commonly formed by reducing a transition metal compound with an organometallic compound. The reduced transition metal compound is then used, alone or in conjunction with an activator, which may be the same or a different organometallic compound, to polymerize olefins, especially ethylene, in the presence of an inert solvent. A molecular weight regulator, such as hydrogen, may be used with these catalyst systems, as taught by Vandenberg in U.S. Pat. No. 3,051,690.

Ziegler et al, in U.S. Pat. No. 3,070,549 teach that catalysts can be prepared by reduction of transition metal salts with organometallic compounds of magnesium or zinc, either alone or in combination with organoaluminum compounds. Yields in the order of 500 grams of polyethylene per gram of transition metal were obtained.

Ziegler et al, in U.S. Pat. No. 3,392,162 teach that the organometallic compound used as reducing agent for the transition metal salts can be mixed complexes of organolithium and organoaluminum, organomagnesium or organozinc compounds. Similar low yields of polyethylene were obtained.

We have previously shown, in copending application Ser. No. 722,794, filed Feb. 2, 1977 that catalysts prepared by reduction of tetrabutyl titanate with a mixed magnesium-aluminum alkyl followed by deactivation of any excess magnesium alkyl by the addition of hydrogen chloride gave extremely high yields of polyethylene when this catalyst was used in combination with a trialkylaluminum activator-scavenger to polymerize ethylene in an inert hydrocarbon solvent at low pressures. Unfortunately, in the absence of the activator-scavenger during the polymerization, only a trace amount of polymer was formed using the same catalyst.

BRIEF SUMMARY OF THE INVENTION

We have now found that in the absence of an activator-scavenger, the catalyst activity is dependent on a specific and unpredicted order of addition of catalyst components during preparation of the catalyst. The active catalyst must be prepared by first reducing a first increment of the tetrabutyltitanate with the magnesium-aluminum alkyl. This reaction mixture is then treated with sufficient hydrogen chloride to deactivate any excess alkyl compound. Finally, a second increment of tetrabutyltitanate is added. The resultant catalyst is highly efficient for ethylene polymerization without the need for additional aluminum alkyl as activator-scavenger.

DETAILED DESCRIPTION OF THE INVENTION

The catalyst of the invention comprises a reaction product from the steps of (1) reducing tetrabutyltitanate with an excess of a mixed magnesium-aluminum alkyl of formula $R_2Mg.2AlR'_3$, where R and R' may be the same or different alkyl groups having 1 to 20 carbon atoms; (2) deactivating any excess magnesium alkyl with hydrogen chloride; and (3) adding a second increment of tetrabutyltitanate.

The ethylene polymerization process of the invention involves subjecting ethylene in an inert hydrocarbon medium to low pressure polymerization conditions in the presence of a catalytic amount of the above described catalyst.

The catalyst of the invention is conveniently prepared directly in the polymerization reactor by admixing inert hydrocarbon solutions of the organometallic reducing compound, the tetrabutyltitanate, and the hydrogen chloride in the prescribed order. The reduction of the first increment of titanate can be effected in a separate catalyst reactor, if desired.

The inert hydrocarbon diluent used for preparing the catalyst solutions is that to be used as a reaction medium for the ethylene polymerization process. Suitable inert hydrocarbons are the paraffinic and cycloparaffinic hydrocarbons having from 5 to 10 carbon atoms, such as pentane, isopentane, hexane, heptane, octane, decane, cyclopentane, cyclohexane, methylcyclohexane and aromatic hydrocarbons, such as benzene, xylene, toluene and the like. For ethylene polymerization, hexane is the preferred diluent. The organometallic reducing agent suitable in the present invention is a complex of formula $R_2Mg.2AlR'_3$ wherein R and R' may be the same or different alkyl derivatives having 1 to 20 carbon atoms such as methyl, ethyl, propyl, and hexyl.

The amount of organometallic reducing agents used is not critical. The ratio of reducing agent to titanate may vary from 50 to 350, although ratios of from 100 to 300 are preferred. There is normally an excess of organometallic compound remaining after the reduction is completed.

The deactivation agent for the excess organometallic compound is anhydrous hydrogen chloride. The amount of deactivation agent used depends upon the quantity of organometallic compound used to reduce the transition metal compound. Sufficient agent must be used to substantially destroy any excess magnesium alkyl compound.

The tetrabutyltitanate used to prepare the unique catalyst of the invention must be added in two increments during the catalyst preparation. The total titanate concentration to be added to the catalyst may be divided so that the ratio of the first increment to the second increment varies between 6:1 and 0.33:1. The preferred ratio is 1:1, ie. approximately equal increments.

In the typical catalyst preparation, the reduction of titanate may be carried out at temperatures between $-100°$ C. and $125°$ C., but are preferably carried out between $-30°$ C. and $50°$ C. The reagents are mixed at, for example, $0°$ C. and, after reduction is complete, the mixture is allowed to warm up to room temperature or above and the hydrogen chloride added. The second increment of titanate is then added, and the mixture allowed to equilibrate prior to addition of the ethylene.

The polymerization of ethylene is conveniently carried out in an autoclave or other suitable pressure apparatus. The apparatus is charged with solvent and catalyst components in the prescribed order and allowed to equilibrate. The reactor is then pressured with ethylene and a molecular weight regulator such as hydrogen, if used. Polymerization pressures depend mainly on the limitations of the equipment used, but a normal range of pressures would be from 1 to 50 atmospheres with a preferred range of from 2 to 10 atmospheres. Temperatures of polymerization usually are from $0°$ C. to $150°$ C., preferably between 50° and 100° C. The catalyst concentration suitable for the invention are between 0.001 and 10 millimoles of titanium per liter of solvent, preferably between 0.005 and 0.25 millimoles per liter.

The invention is further illustrated by, but not limited by the following examples.

EXAMPLE I a. Catalyst preparation

To a 1 gal., dried, nitrogen flushed, stirred autoclave was added 2 liters of dried n-hexane and the autoclave cooled to 0° C. With stirring, there was then added 0.5 ml. (0.012 millimoles) of a 0.024 molar solution of tetrabutyltitanate (TBT) in n-hexane and 6.0 millimoles of a complex magnesium-aluminum alkyl ($Bu_2Mg \cdot 2AlEt_3$, marketed by Stauffer Chemical Co. as Magala 0.5E). The reactor was warmed up to 35° C. over a 10 minute period. There was then added 12.0 millimoles of anhydrous hydrogen chloride to decompose the excess organomagnesium complex and then a second increment of 0.012 millimoles of TBT was added. The Magnesium to titanium (Mg/Ti) ratio of this catalyst was 250.

b. Polymerization of ethylene

After stirring for 5 minutes to allow for equilibration of the slurry, the autoclave was sealed, heated to 50° C., pressured to 7 psig with hydrogen and then to 50 psig. with ethylene. The polymerization temperature was adjusted to 80° C. and allowed to proceed for 2 hours, while maintaining the 50 psig. pressure by the addition of ethylene. After 2 hours, the mixture was cooled, the autoclave vented and discharged and the slurry filtered. The polymer was dried to give 272g. of a fine white powder of melt index 1.14 g/10 minutes under an applied load of 2160g. at 190° C. (ASTM-1238) and a bulk density of 6.21 pounds per cubic foot (pcf.). The catalyst efficiency was 236,600 g. PE/g.Ti.

c. Comparative polymerization a

The catalyst was prepared in the autoclave as in Example Ia except that all of the TBT (0.024 millimoles) was added initially. No second increment was added following the addition of the hydrogen chloride.

The polymerization was carried out precisely as in Ib. No polyethylene was obtained. The catalyst was inactive.

When the Mg/Ti ratio of the catalyst was reduced from 250 to 100, some polyethylene could be obtained, but the catalyst efficiency was only 16,100 g. PE/g.Ti.

d. Comparative polymerization B

The catalyst was prepared in the autoclave as in Example Ia. except the components were added in the order: TBT (0.012mm), Magala (6.0mm), TBT (0.012mm), and then HCl (14.0mm).

The polymerization was then attempted as in Ib. and, again, no polymer was obtained. The catalyst had no activity.

e. Comparative polymerization C

The catalyst was prepared in the autoclave as in Example Ia except the order of addition of the components was Magala (6.0mm), HCl (12mm), and, then TBT (0.024mm).

The polymerization was then attempted as in Ib. This time 48.5 g. of polyethylene having a melt index of 1.03 g/10 minutes and a bulk density of 6.33 pcf. were obtained. The catalyst efficiency was 42,200 g. PE/g.Ti, which is higher than some catalyst efficiencies obtained with Ziegler catalysts, but not nearly as high as anticipated by the present invention.

EXAMPLE II

To illustrate the range of various increment sizes usable in the invention, a series of experiments was run all using a total concentration of TBT of from 0.024–0.028 millimoles (mm.), a Magala concentration of 6.0 mm., and 12.0 mm. of hydrogen chloride. The order of addition of catalyst components was always first increment of TBT, Magala, HCl and then second increment of TBT. The polymerizations were run at 80° C. for 2 hours at a total pressure of 50 psig., with varying hydrogen pressure as noted to regulate melt index of the polyethylene. The results are shown in the Table.

TABLE

| Run No. | 1st TBT, mm. | 2nd TBT mm. | 1st/2nd Ratio | Hydrogen pressure psig | Polymer g. | M.I.* g./10 min. | catalyst efficiency, g.PE/g.TI |
|---|---|---|---|---|---|---|---|
| 1 | 0.024 | 0.004 | 6:1 | 10 | 94.1 | 0.30 | 70,200 |
| 2 | 0.020 | 0.004 | 5:1 | 15 | 106.7 | 0.78 | 92,800 |
| 3 | 0.014 | 0.012 | 1.2:1 | 7 | 297.9 | 0.47 | 259,100 |
| 4 | 0.012 | 0.012 | 1:1 | 15 | 212.3 | 3.23 | 184,700 |
| 5 | 0.012 | 0.012 | 1:1 | 7 | 272.0 | 1.14 | 236,600 |
| 6 | 0.006 | 0.018 | 0.33:1 | 7 | 72.2 | 0.19 | 62,800 |

*Applied weight 2160 g. at 190° C. (ASTM-1238)

It follows from the table, that efficient catalytic activity is obtained over increment ranges from 6:1 to 0.33 to 1, although best activity occurs when the increments are nearly equal.

We claim:

1. A catalyst for the polymerization of ethylene consisting essentially of the product from the steps of (1) reducing a first increment of tetrabutyltitanate with a mixed magnesium-aluminum alkyl of formula $R_2Mg \cdot 2AlR'_3$, where R and R' may be the same or different alkyl groups having from 1 to 20 carbon atoms; (2) adding hydrogen chloride to the reaction product from (1) in an amount of about 2 moles of chloride per mole of mixed magnesium aluminum alkyl to deactivate any excess magnesium alkyl; and (3) adding a second increment of tetrabutyltitanate; said first and second increments of tetrabutyltitanate being selected such that the mole ratio of first to second increments is between 6:1 and 0.33:1; and said mixed magnesium alkyl being added in step (1) in an amount such that the mole ratio of magnesium alkyl to total titanate is between 50:1 and 350:1.

2. A method for the preparation of a catalyst for the polymerization of ethylene which comprises (1) reducing a first increment of tetrabutyltitanate with a mixed magnesium-aluminum alkyl of formula $R_2Mg \cdot 2AlR'_3$, where R and R' may be the same or different alkyl groups having 1 to 20 carbon atoms; (2) deactivating any excess magnesium alkyl by adding hydrogen chloride in an amount of about 2 moles of chloride per mole of mixed magnesium-aluminum alkyl to react with the alkyl compound; and (3) adding a second increment of tetrabutyltitanate; said first and second increments of tetrabutyltitanate being selected such that the mole ratio of first to second increments is between 6:1 and 0.33:1; and said mixed magnesium alkyl being added in step (1) in an amount such that the mole ratio of magnesium alkyl to total titanate is between 50:1 and 350:1.

3. A method for the polymerization of ethylene comprising subjecting ethylene to a temperature of from 0° to 150° C. at pressures of from 1 to 50 atmospheres in an inert hydrocarbon solvent with 0.005 to 10 millimoles per liter of solvent of a catalyst which is the reaction product from the steps of (1) reducing a first increment of tetrabutyltitanate with a mixed magnesium-aluminum alkyl of formula $R_2Mg \cdot 2AlR'_3$ where R and R' may be the same or different alkyl groups having 1 to 20 carbon atoms; (2) adding hydrogen chloride in an amount of about 2 moles of chloride per mole of mixed magnesium-aluminum alkyl to deactivate any excess magnesium alkyl; and (3) adding a second increment of tetrabutyltitanate; said first and second increments of tetrabutyltitanate being selected such that the mole ratio of first to second increments is between 6:1 and 0.33:1; and said mixed magnesium alkyl being added in step (1) in an amount such that the mole ratio of magnesium alkyl to total titanate is between 50:1 and 350:1.

* * * * *